Nov. 11, 1941. C. I. MacNEIL ET AL 2,262,330
DRIVING MECHANISM
Original Filed July 21, 1934
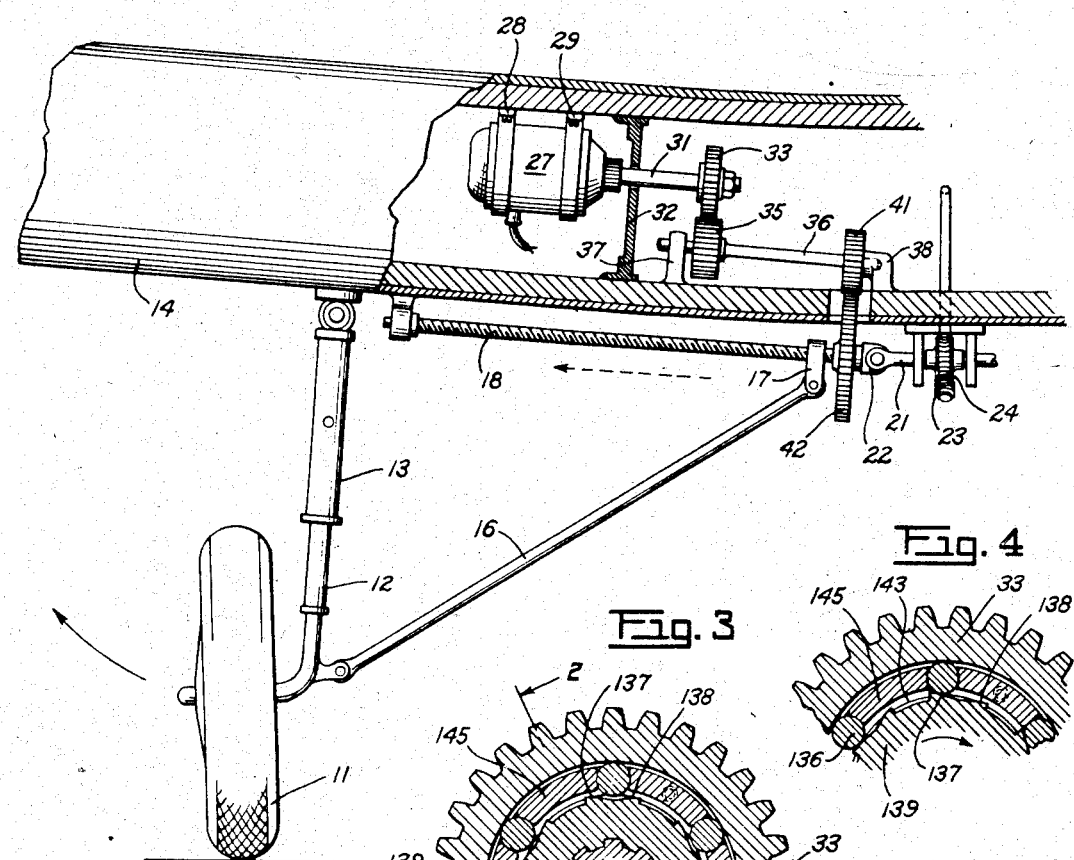
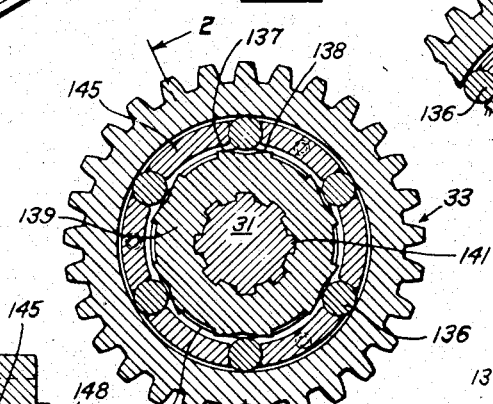
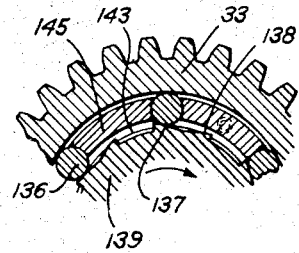
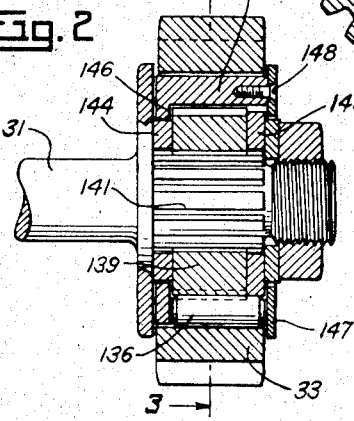
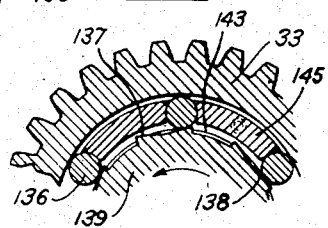
INVENTORS.
Charles I. MacNeil
Donald M. Berges
BY Martin J. Finnegan
ATTORNEY.

Patented Nov. 11, 1941

2,262,330

UNITED STATES PATENT OFFICE 2,262,330

DRIVING MECHANISM

Charles I. MacNeil, Glen Ridge, and Donald M. Berges, Alpine, N. J.

Original application July 21, 1934, Serial No. 736,411. Divided and this application March 23, 1939, Serial No. 263,812

3 Claims. (Cl. 74—389)

This invention relates to driving mechanism, and particularly to the driving of a reciprocable or reversible device.

An object of the invention is to provide both power and manual operating means for such a reciprocable or reversible device, and to provide a control therefor operating in such manner as to make it possible to utilize the manual means for two-way (forward and return) actuation of the reciprocable or reversible device without disturbing the condition of, or causing movement of the power means.

In the preferred embodiment of the invention as illustrated in the accompanying drawing, the novel operating and control means are shown applied to a landing gear mechanism of the type disclosed in Patent No. 1,704,076 granted to Edward R. Carroll on March 5, 1929, but it is to be understood that the invention is applicable to any of the known types of retractible alighting gear as well as to other uses and the appended claims therefore are not to be construed as limited to any special application of the invention, except in so far as such limitations are expressly recited therein.

In the drawing, Fig. 1 is a front elevation with a portion broken away and sectioned to show that portion of the control mechanism which is mounted within the wing of the craft. Fig. 3 is a sectional view at right angles to the view point of Fig. 1, of one portion of the control means. Fig. 2 is a sectional view taken along the line 2—2 of Fig. 3, and Figs. 4 and 5 are fragmentary views similar to Fig. 3 but showing different conditions of operation.

Referring first to Fig. 1, the invention is shown as applied to a landing gear which includes a wheel 11 having disc plate centers flush with the sides of the tire as in the Carroll patent above identified, the said wheel being mounted on an axle 12 which as shown has a shock absorber device 13 incorporated therewith. Also as in the Carroll patent above identified, the axle 12 may be moved from the position shown to a retracted position within a suitable recess (not shown) in the wing 14, and for this purpose there is provided a strut bar 16 which engages through a threaded collar 17, a screw 18, the pitch of the threads of which is such that the wheel 11 may be rigidly secured in any position. Manual actuating means for the screw may consist of a shaft 21 connected with the screw 18 through the intermediate universal joint 22 and adapted to be controlled from the pilot's position through a worm and pinion drive as indicated at 23 and 24, corresponding to the manual operating means in the Carroll patent above identified.

Supplementing the manual operating means just referred to, the present invention provides additional operating means in the form of a reversible electrical motor 27 suitably secured to the frame work of the wing 14 as indicated at 28 and 29 and adapted to drive a shaft 31 supported as indicated at 32 and having a two-way over-running clutch device 33 mounted thereon, adapted to transmit the torque of the motor to a gear or pinion 35 when the motor is running in one direction, and likewise when the motor is running in the opposite direction. As shown, the driven element 35 is operatively secured to a shaft 36 mounted in bearings 37 and 38 secured to the wing frame, a second gear or pinion 41 being also secured to the shaft 36 and adapted to drive a gear 42 keyed or otherwise drivably connected to one end of the screw 18.

When an ordinary roller clutch is arranged to normally drive from a driving shaft to a driven shaft in response to clockwise rotation for example, it will also permit a reverse drive from the normally driven shaft back to the normal driving shaft as the direction of rotation of the former is reversed from clockwise to counterclockwise. In a mechanism of the character to which the present invention is directed, such a reverse drive would obviously be objectionable for it would add to the load upon the manually operable gears 23 and 24 the frictional resistance set up in the interior of the motor 27, as, for example, the drag of the motor brushes upon the motor commutator (in cases where a commutator type of motor is employed). To eliminate this and other objectionable features of such a reverse drive we propose to employ the construction indicated in Figs. 2 to 5, in which the construction of the overrunning clutch device 33 is such that the operation differs from that of the conventional overrunning clutch, the major difference in result being that it is impossible to transmit torque from the shaft 36 to the shaft 31 regardless of the direction of rotation of the former.

As shown in Figs. 2, 3, 4, and 5, the clutch preferably includes rollers 136, each adapted for limited movement relative to its associated pair of cam faces 137 and 138, there being a plurality of such faces projecting radially from a member 139 splined to the shaft 31 as indicated at 141. These cam faces are inclined in opposite directions as shown, and extend somewhat beyond the periphery of a disc 143 which co-operates with a second disc 144 to constitute an inner race for the rollers 136, the outer race being constituted by the inner surface of gear 33. The roller cage 145 has a rim 146 extending inwardly therefrom to prevent lateral displacement, and is supplemented by a retaining disc 147 held thereto by suitable means 148. Movement of the member 139 in response to energization of the motor causes the rollers to be wedged between the cam faces 137 (or 138 as the case may be, depending on the direction of drive from shaft 31) and the gear 33, in the manner indicated in Figs. 4 and 5; the rollers being returned to the non-driving position indicated in Fig. 3 as soon as motor shaft 31 is de-energized, such return being by reason of the inertia of the driven parts.

In operation, when the motor is energized to rotate in the direction indicated in Fig. 4, the cage 145 and member 139 are moved slightly in relation to the rollers 136, thereby causing the latter to jam between faces 137 and the outer race constituted by gear 33. When the motor is de-energized, the gear 33 runs ahead of the roller cage assembly, and returns the rollers to the neutral position (Fig. 3) wherein they roll freely on inner race disc 143 and outer race 33. As a result, contact is lost between member 139 and rollers 136. The gear 33 may then come to a stop and be manually driven (from members 23, 24) in the reverse direction without dragging cage and roller assembly with it. Or, if the motor 27 is reversed, the rollers will be engaged by the opposite set of cams 138.

It will be evident from the foregoing that the rollers 136 will be held out of driving relation to the shaft 31 at all times, except during the energization of the motor 27 and that accordingly the operator is free to retract or project the landing gear 11 manually through the elements 23 or 24 without encountering any drag or resistance from the power elements which at such time would be de-energized and will remain at rest and out of interfering relation with the manually operable means.

While the embodiment herein shown is of considerable practical merit, it is to be understood that various changes may be made in the construction, arrangement and inter-relation of the parts entering into the invention without departing from the spirit thereof, the extent of the included variations being ascertainable by reference to the broadest of the appended claims.

This application is a division of co-pending application Serial No. 736,411 filed July 21, 1934.

What I claim is:

1. The combination, with a pair of driving shafts and a single driven shaft, of connections intermediate said driving shafts, on the one hand, and said driven shaft, on the other, said connections comprising a two-way overrunning clutch having one race thereof rotatable in response to rotation of either of said driving shafts in either direction, and a second race rotatable only in response to rotation of a predetermined one of said driving shafts, means for drivably connecting said predetermined driving shaft with said second clutch race, and means for drivably connecting the other driving shaft with said first-named clutch race.

2. The combination, with a pair of driving shafts and a single driven shaft, of connections intermediate said driving shafts, on the one hand, and said driven shaft, on the other, said connections comprising a two-way overrunning clutch having an outer race rotatable in response to rotation of either of said driving shafts in either direction, and an inner race rotatable only in response to rotation of a predetermined one of said driving shafts, means for drivably connecting said predetermined driving shaft with said inner clutch race, and means for drivably connecting one of said driving shafts with said driven shaft, said means including a part which also drivably connects said outer clutch race with said driven shaft.

3. The combination, with a pair of driving shafts and a single driven shaft, of positive driving connections between one of said driving shafts and said driven shaft, said positive driving connections including a gear driven by said driving shaft and mounted on said driven shaft, and means for drivably connecting the other of said driving shafts with said gear, for rotation of said gear first in one direction and then the other, said connecting means including two clutch elements, one of which rotates whenever said gear is rotated, and means interposed between said clutch elements to prevent rotation of the other clutch element in either direction, except upon rotation of said second-named driving shaft.

CHARLES I. MacNEIL.
DONALD M. BERGES.